US005266286A

United States Patent [19]
Ukawa et al.

[11] Patent Number: 5,266,286
[45] Date of Patent: Nov. 30, 1993

[54] FLUE GAS DESULFURIZATION PROCESS

[75] Inventors: Naohiko Ukawa; Susumu Okino; Kenji Inoue; Toshiaki Kinomoto, all of Hiroshima; Taku Shimizu, Tokyo, all of Japan

[73] Assignee: Mitsubishi Jukogyo Kabushiki Kaisha, Tokyo, Japan

[21] Appl. No.: 895,546

[22] Filed: Jun. 8, 1992

[30] Foreign Application Priority Data

Jun. 10, 1991 [JP] Japan .................................. 3-137900

[51] Int. Cl.$^5$ ..................... C01B 17/00; C01B 17/22
[52] U.S. Cl. ............................................. 423/243.08
[58] Field of Search .............. 423/235, 243.08, 240 R, 423/235 D

[56] References Cited

U.S. PATENT DOCUMENTS

| 4,038,367 | 7/1977 | Atsukawa et al. | 423/235 |
| 4,038,368 | 7/1977 | Atsukawa et al. | 423/235 |
| 4,107,271 | 8/1978 | Atsukawa et al. | 423/235 |
| 5,059,406 | 10/1991 | Sheth | 423/244 |

FOREIGN PATENT DOCUMENTS

| 0437941 | 7/1991 | European Pat. Off. . |
| 0442074 | 8/1991 | European Pat. Off. . |
| 0465439 | 1/1992 | European Pat. Off. . |

Primary Examiner—Gregory A. Heller
Attorney, Agent, or Firm—McAulay Fisher Nissen Goldberg & Kiel

[57] ABSTRACT

A flue gas desulfurization process for treating flue gases containing $SO_2$, $NO_x$, and halogen gases by the wet lime method, in which part of the absorbent liquid is extracted, freed from iodine, and recycled as makeup water to the absorption column.

3 Claims, 5 Drawing Sheets

FLUE GAS DESULFURIZATION PROCESS

FIELD OF THE INVENTION AND RELATED ART STATEMENT

The present invention relates to improvements in flue gas desulfurization by the wet lime method, and more specifically to a process advantageously applicable to the desulfurization by the wet lime method of flue gases containing $SO_2$, $NO_x$, and halogen gases.

In the course of desulfurization by the wet lime method of flue gases containing $SO_2$, $NO_x$, and halogen gases, $SO_2$ is absorbed, as is well known, by a lime-containing absorbent liquid in the reaction (1) to form calcium sulfite. $NO_x$ and halogens too are partly absorbed by the same solution.

$$SO_2 + CaCO_3 \rightarrow CaSO_3 + CO_2 \qquad (1)$$

The absorbed $SO_2$ and $NO_x$ partly react in the absorbent liquid and form nitrogen-sulfur compounds (hereinafter called "N-S compounds"). The N-S compounds inhibit the oxidation reaction (2) of calcium sulfite to gypsum, an important process in the wet lime method.

$$CaSO_3 + \tfrac{1}{2}O_2 \rightarrow CaSO_4 \qquad (2)$$

The sulfite ions thus left unoxidized cause incomplete dissolution of the absorbent (limestone) and an increase in the partial pressure of $SO_2$, leading to low desulfurization performance.

If iodine ions coexist in the absorbent liquid with the halogen gases concurrently absorbed, the reaction-hindering effect of the N-S compounds upon the reaction (2) becomes much pronounced, resulting in a serious drop of the sulfur removal efficiency.

In the art of the wet-lime-method desulfurization of flue gases containing $SO_2$, $NO_x$, and halogen gases, therefore, efforts have hitherto been made to offset this inhibition of oxidation by the N-S compounds and iodine, e.g., by the introduction of the absorbent in excess or by the installation of an absorption equipment with a large enough capacity.

OBJECT AND SUMMARY OF THE INVENTION

In view of the state of the art described above, the present invention has for its object to provide a flue gas desulfurization process which eliminates the adverse effects of the N-S compounds and iodine that coexist in the absorbent slurry, promotes the oxidation of calcium sulfite, and thereby maintains high desulfurization performance.

It has now been found, in the first place, after further investigations on the N-S compounds secondarily produced by the wet-lime-method desulfurization for the treatment of flue gases containing $SO_2$, $NO_x$, and halogen gases, that the N-S compounds are mostly of the hydroxylamine type.

Second, it has been found that if iodine, one of halogen gases, is also present in the absorbent liquid, the N-S compounds become even more inhibitory to the oxidation of the sulfite ions, with a consequent increase in the unoxidized, residual sulfurous acid concentration in the absorbent liquid, as indicated in FIG. 3.

It has then been found that the deleterious effects of oxidation inhibition can be minimized without any unwanted increase in the volume of makeup water, by extracting a part of the absorbent liquid, removing iodine from the liquid, and then recycling the liquid as makeup water to the absorption column.

Iodine in the absorbent liquid occurs as iodine ion $(I^-)$ under the reducing action of sulfite ion. Further investigations on the way of removing the iodine ion $(I^-)$ have now revealed the following:

(i) Iodine can be removed by dispersion in vapor form out of the absorbent liquid, as indicated in FIG. 4, when a carrier gas, such as air or nitrogen, is passed for aeration through the absorbent liquid following the oxidation treatment by the addition of chlorine, hypochlorous acid, ozone, hydrogen peroxide, or other oxidizing agent of iodine ion $(I^-)$ to iodine $(I_2)$ in a reaction (3):

$$2I^- \rightarrow I_2 + 2e \qquad (3)$$

Iodine $(I_2)$ is known to have a relatively high vapor pressure and is most effectively removed by the carrier gas passage.

(ii) Iodine $(I_2)$ after the oxidation treatment can be easily removed with an adsorbent like activated carbon, as shown in FIG. 5, and therefore the carrier gas passage may be replaced by the use of an iodine adsorbent for the purpose of iodine removal.

Thus, the gist of the present invention resides in the following:

(1) In a flue gas desulfurization process for treating flue gases containing $SO_2$, $NO_x$, and halogen gases by the wet lime method, the improvement which further comprises extracting a part of the absorbent liquid, removing iodine from the liquid, and recycling the liquid as makeup water to an absorption column.

(2) A process according to (1) above which further comprises adding an oxidizing agent to the extracted absorbent liquid and passing a carrier gas through the liquid to remove iodine therefrom.

(3) A process according to (1) above which further comprises adding an oxidizing agent to the extracted absorbent liquid and then passing the liquid through an iodine adsorbent.

DETAILED DESCRIPTION OF PREFERRED EMBODIMENTS

Example 1

Figure 1:
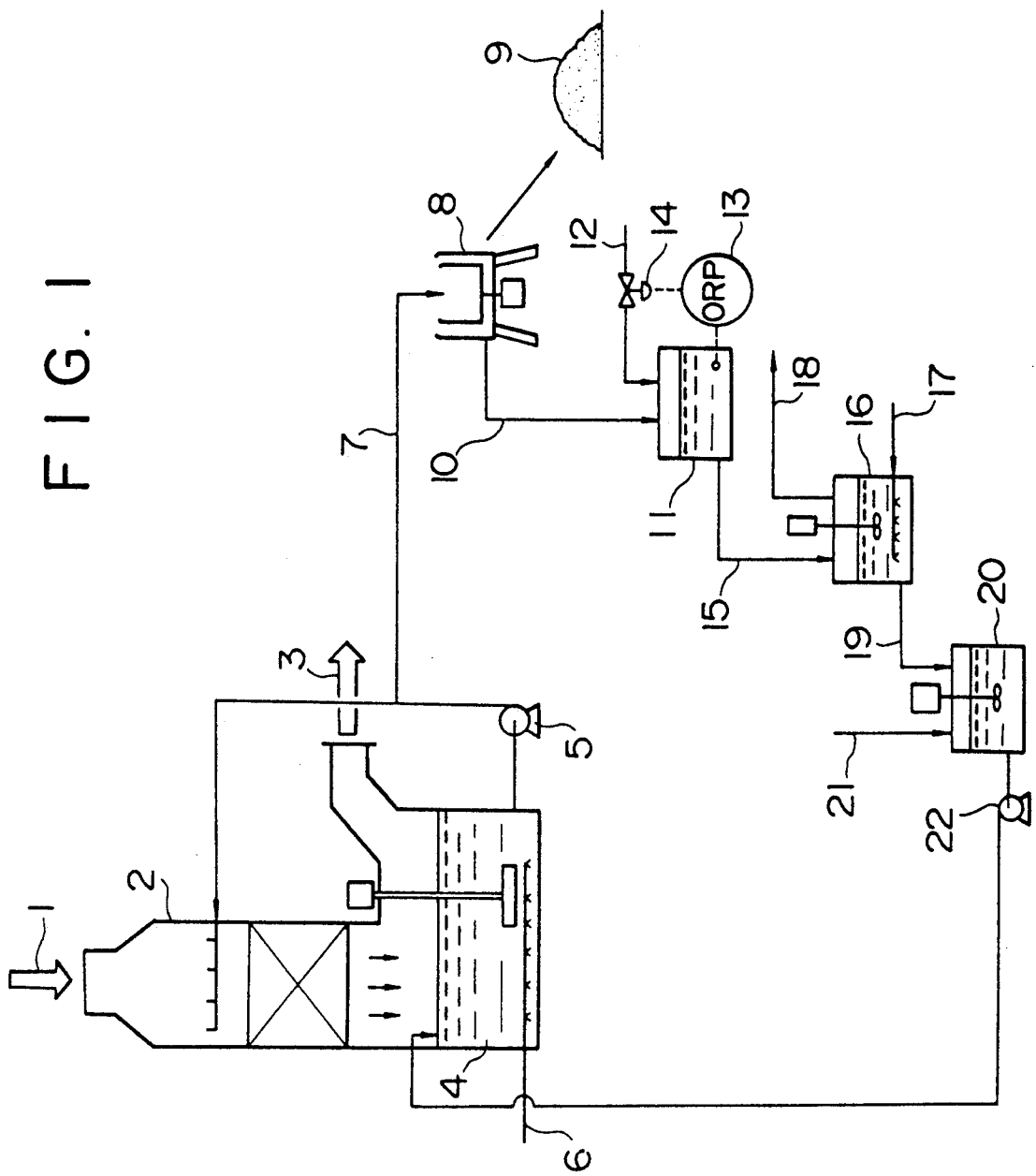
FIG. 1 is a flow sheet of an example of the present invention.

Flue gas from a small-size pulverized coal firing equipment (not shown) was separately taken out at a rate of 200 m³N/h. Following dedusting, the emission was treated by the wet-lime-method flue gas desulfurization process of the invention using the apparatus shown in FIG. 1. The treated gas had an $SO_2$ concentration of 3000 ppm and an $NO_x$ concentration of 800 ppm.

Flue gas treated in this way is introduced, via a feed line 1, into an absorption column 2, where $SO_2$, $NO_x$, and halogen gases including iodine are partly removed, and the residual gas is discharged through a line 3. There is provided underneath the absorption column 2 a slurry tank 4 which holds an absorbent slurry and is supplied with air for oxidation by an oxidizing-air supply line 6 at the bottom. The absorbent slurry is recycled from the slurry tank 4 to the top of the absorption column 2 by an absorbent liquid pump 5.

Part of the absorbent slurry is extracted through a line 7 into a centrifuge 8, where high-purity gypsum is separated out and the filtrate is transferred through a line 10 into an oxidation tank 11. Meanwhile sodium hypochlorite, an oxidizing agent for iodine ions ($I^-$), is supplied to the oxidation tank 11 via a line 12. The amount of sodium hypochlorite to be added is adjusted with a regulating valve 14 in such a way as to keep a sufficient oxidation potential to oxidize the iodine ions determined by calibration beforehand, through measurement of the oxidation-reduction potential (ORP) of the solution inside the tank by means of an ORP meter 13.

After the oxidation treatment, the filtrate extracted from the oxidation tank 11 through a line 15 is supplied to an aeration-agitation tank 16. The tank 16 is supplied with air at the bottom from a line 17, and the air after gas-liquid contact is discharged out of the system via a line 18. The aerated filtrate is sent through a line 19 to a limestone-slurrying tank 20.

The limestone-slurrying tank 20 is fed with powdered limestone through a line 21, and the resulting limestone slurry with a predetermined concentration is supplied to the slurry tank 4 at a controlled rate by a limestone slurry supply pump 22.

Under the conditions described, a steady-state operation of the apparatus was performed. The stable operation was possible with the outlet gas showing an $SO_2$ concentration of 110 ppm. The pH of the absorbent slurry in the slurry tank 4 was 5.5. A sulfite ion analysis of the absorbent liquid gave results below the detection limit (approx. 1 mmol/l), indicating that the oxidation reaction of sulfurous acid was in satisfactory progress. An analysis of the total iodine concentration in the absorbent slurry again gave values below the detection limit (approx. 0.01 mmol/l). No N-S compound was detected in the absorbent liquid.

Example 2

Figure 2:
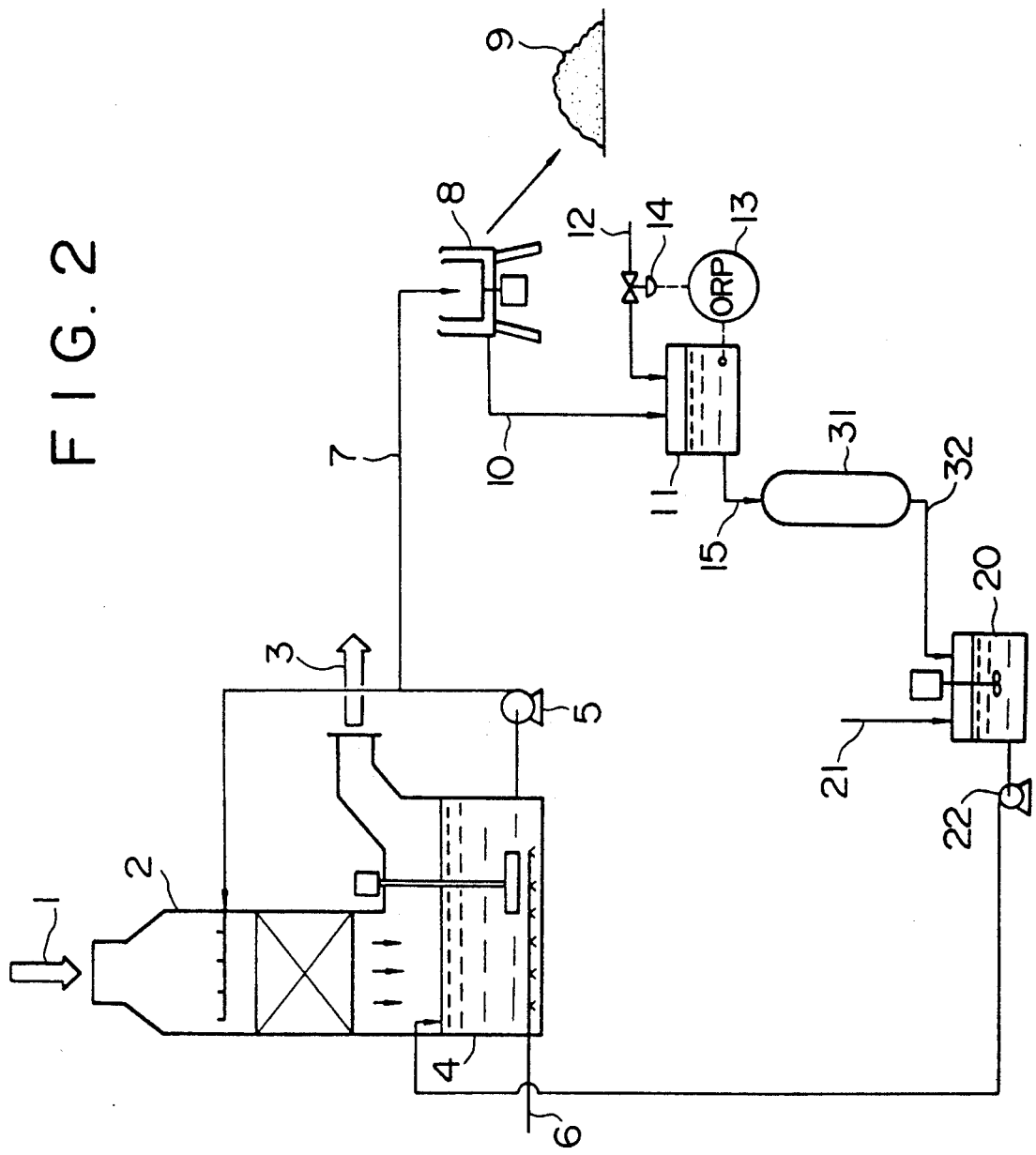
FIG. 2 is a flow sheet of another example of the invention.
Figure 3:
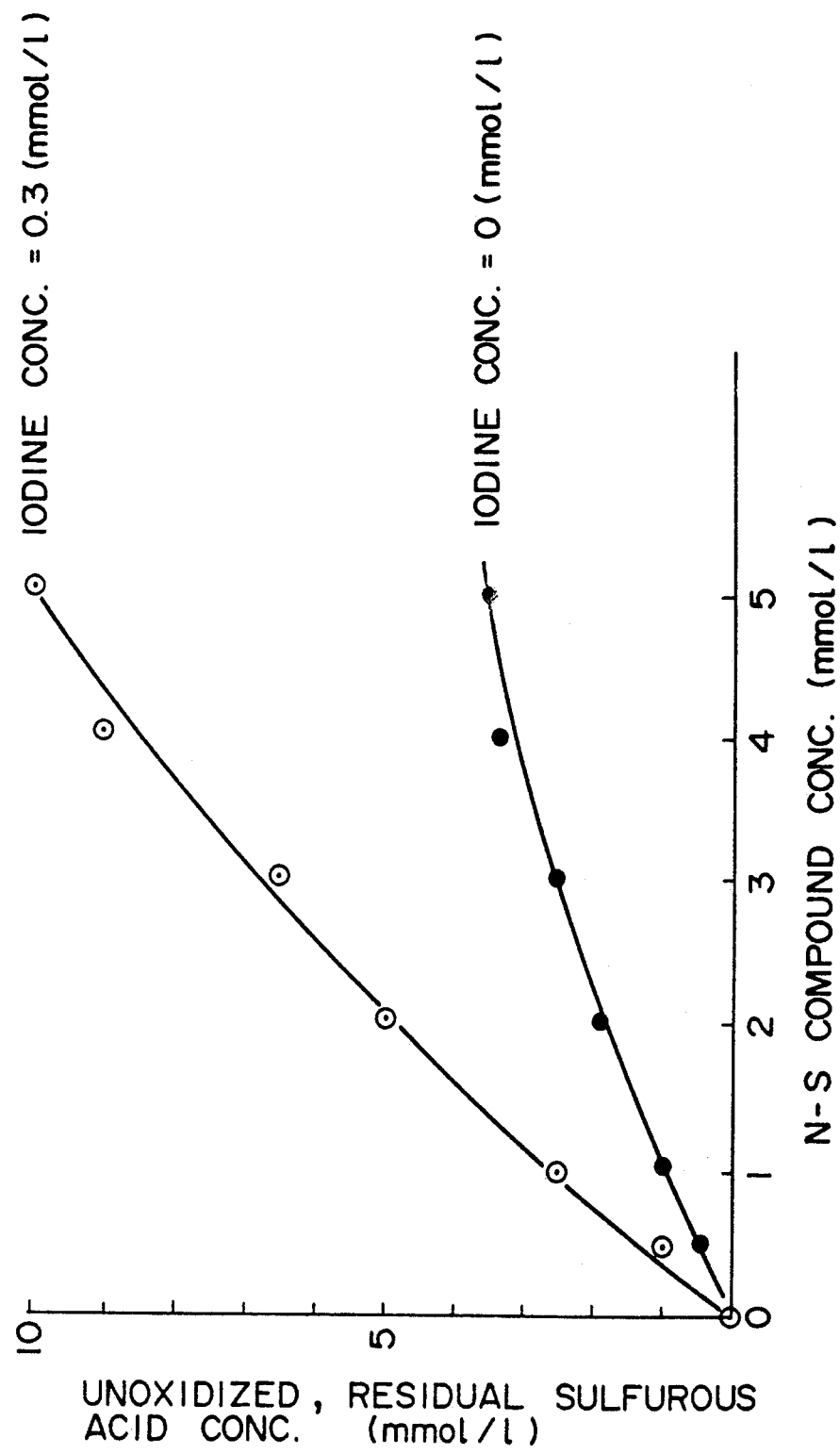
FIG. 3 is a graph illustrating the influences of iodine present together with N-S compounds in absorbent liquids upon the oxidation of sulfite ions.
Figure 4:
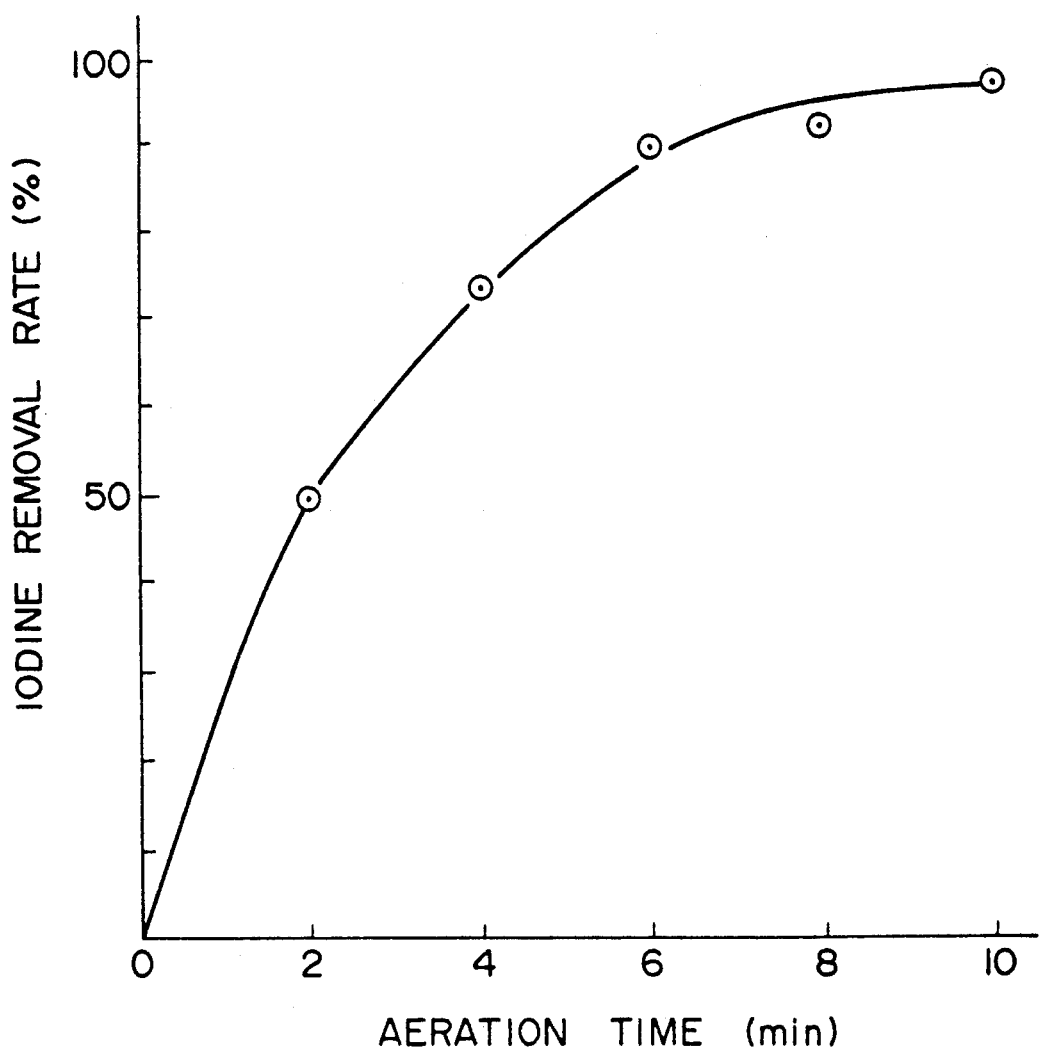
FIG. 4 is a graph showing the relation between the amount of aeration and the rate of iodine removal from an absorbent liquid.
Figure 5:
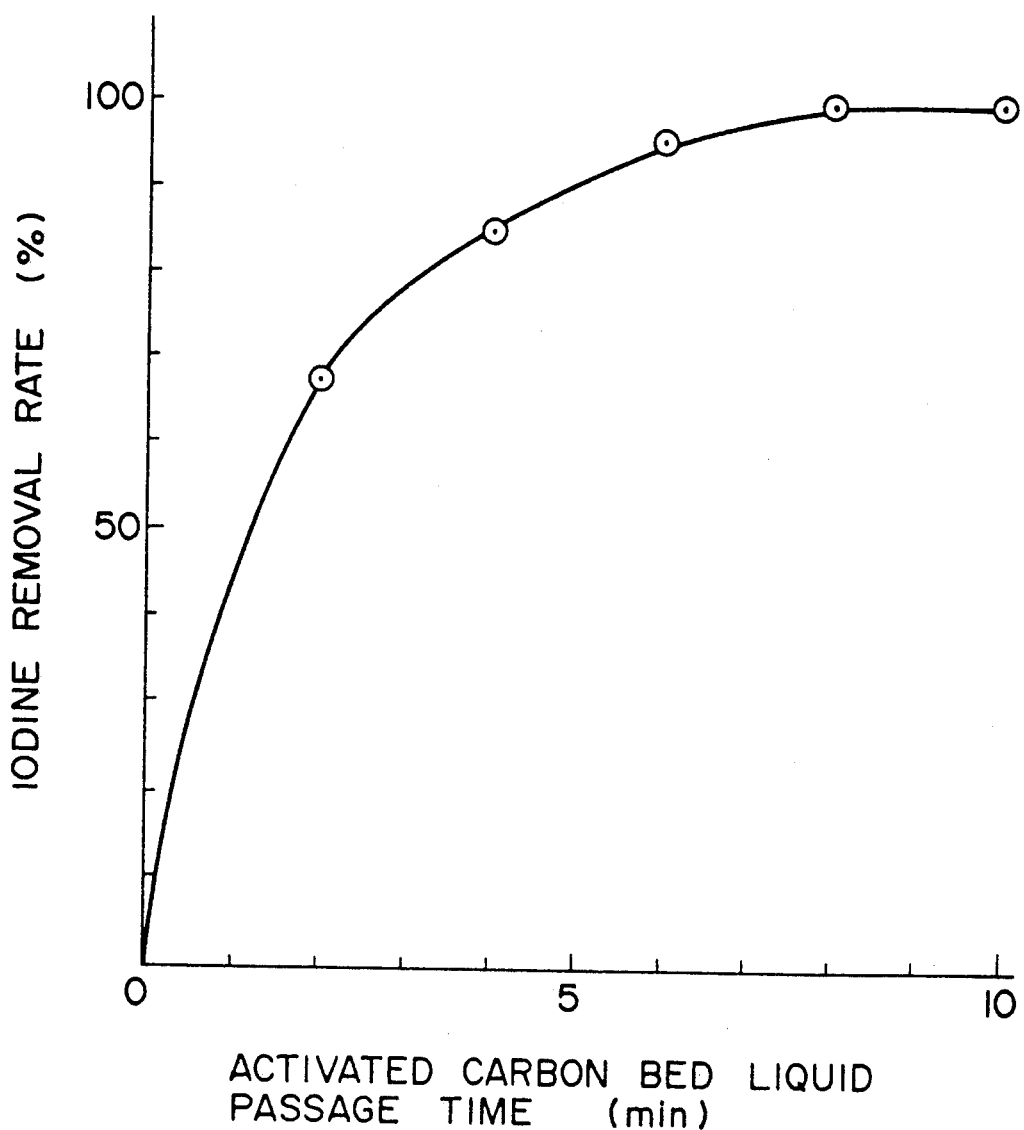
FIG. 5 is a graph showing the relation between the period of retention in an activated carbon filter and the rate of iodine removal from an absorbent liquid.

Another example of the invention will now be explained with reference to FIG. 2. Numerals 1 to 15 and 20 to 22 designate like parts shown in FIG. 1. The flue gas conditions were the same as those in the example of FIG. 1

Here again treated flue gas is introduced, via a feed line 1, into an absorption column 2, where $SO_2$, $NO_x$, and halogen gases including iodine are partly removed, and the residual gas is discharged through a line 3. There is provided underneath the absorption column 2 a slurry tank 4 which holds an absorbent slurry and is supplied with air for oxidation by an oxidizing-air supply line 6 at the bottom. The absorbent slurry is recycled from the slurry tank 4 to the top of the absorption column 2 by an absorbent liquid pump 5.

Part of the absorbent slurry is extracted through a line 7 into a centrifuge 8, where high-purity gypsum is separated out and the filtrate is transferred through a line 10 into an oxidation tank 11. Meanwhile sodium hypochlorite, an oxidizing agent for iodine ions ($I^-$), is supplied to the oxidation tank 11 via a line 12. The amount of sodium hypochlorite to be added is adjusted with a regulating valve 14 in such a way as to keep a sufficient oxidation potential to oxidize the iodine ions determined by calibration beforehand, through measurement of the oxidation-reduction potential (ORP) of the solution inside the tank by means of an ORP meter 13.

After the oxidation treatment, the filtrate extracted from the oxidation tank 11 through a line 15 is supplied to a filter 31 packed with activated carbon. From the filter 31, the filterate is conducted through a line 21 into a limestone-slurrying tank 20. The tank 20 is fed with powdered limestone through a line 21, and the resulting limestone slurry with a predetermined concentration is supplied to the slurry tank 4 at a controlled rate by a limestone slurry supply pump 22.

A steady-state operation under the conditions described above was performed with the outlet gas showing an $SO_2$ concentration of 110 ppm, and the absorbent liquid in the slurry tank 4 had a pH of 5.5.

A sulfite ion analysis of the absorbent liquid gave results below the detection limit (approx. 1 mmol/l), indicating that the oxidation reaction of sulfurous acid was thoroughly in progress. An analysis of the total iodine concentration in the absorbent slurry again gave values below the detection limit (approx. 0.01 mmol/l). No N-S compound was detected in the absorbent liquid.

Comparative Example 1

The same apparatuses as used in Examples 1 and 2 were operated under identical conditions with the exception that the air supply to the aeration-agitation tank 16 through the line 17 was shut off or the activated carbon was taken out of the filter 31, making it unable to function as such. In this comparative example, iodine and small amounts of N-S compounds began to accumulate gradually in the absorbent liquid, with an attendant increase in the sulfite ion concentration, after the start of the operation. In the steady-state operation, the concentrations of sulfite ions were 0.05, 2.0, and 3.0 mmol/l, respectively. Consequently, the pH of the absorbent slurry was 5.2 and the $SO_2$ concentration in the outlet gas was 200 ppm, both of which were obvious increases over the values in Examples 1 and 2.

Comparative Example 2

The apparatuses of Examples 1 and 2 were operated using identical gas conditions except that the supply of sodium hypochlorite through the line 12 was shut off and the air supply to the aeration-agitation tank 16 through the line was interrupted or the activated carbon was taken out of the filter 31, thus suppressing its function. In this comparative example, iodine and N-S compounds gradually accumulated with an attendant increase of sulfite ions after the start of the operation. In the steady state, the concentrations of sulfite ions were 0.05, 7.5, and 6.0 mmol/l, respectively. Thus, the pH of the absorbent slurry was 5.0 and the $SO_2$ concentration in the outlet gas was 420 ppm, both of which were striking increases over the values in Examples 1 and 2.

As has been described above, the present invention eliminates the unfavorable effects of $SO_2$, $NO_x$, and halogen gases in flue gases upon the desulfurization performance and permits maintenance of a high desulfurization efficiency.

We claim:

1. A flue gas desulfurization process for treating flue gases containing $SO_2$, $NO_x$, and halogen gases by a wet lime method using limestone or lime as an absorbent, comprising the steps of passing said flue gases in contact with an absorbent liquid containing limestone or lime, extracting a part of the absorbent liquid, removing iodine from the gases from the extracted absorbent liquid, and recycling the resultant liquid as makeup water to an absorption column.

2. The process as claimed in claim 1 which further comprises adding an oxidizing agent selected from the group consisting of chlorine, hypochlorous acid, ozone, and hydrogen peroxide to the extracted absorbent liquid and passing a carrier gas through the liquid to remove iodine therefrom.

3. The process as claimed in claim 2 which further comprises adding an oxidizing agent to the extracted absorbent liquid and then passing the liquid through an iodine adsorbent.

* * * * *